US007050800B2

(12) United States Patent
Shaheen et al.

(10) Patent No.: US 7,050,800 B2
(45) Date of Patent: May 23, 2006

(54) METHOD AND APPARATUS FOR WLAN-UMTS INTERWORKING EMPLOYING UMTS AIR INTERFACE

(75) Inventors: Kamel M. Shaheen, King of Prussia, PA (US); Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 78 days.

(21) Appl. No.: 10/319,180

(22) Filed: Dec. 13, 2002

(65) Prior Publication Data

US 2004/0192291 A1    Sep. 30, 2004

Related U.S. Application Data

(60) Provisional application No. 60/399,787, filed on Jul. 31, 2002.

(51) Int. Cl.
 *H04Q 7/20* (2006.01)
(52) U.S. Cl. .................... 455/426.2; 455/435.1
(58) Field of Classification Search ............ 455/426.2, 455/426.1, 422.1, 435.1, 435.2, 432.2, 466; 370/338
See application file for complete search history.

(56) References Cited

U.S. PATENT DOCUMENTS

| 6,529,728 | B1 * | 3/2003 | Pfeffer et al. ............ 455/418 |
| 6,687,243 | B1 * | 2/2004 | Sayers et al. ............ 370/356 |
| 6,763,012 | B1 * | 7/2004 | Lord et al. ............... 370/338 |
| 6,795,437 | B1 * | 9/2004 | Rasanen et al. ......... 370/395.1 |
| 2003/0118015 | A1 * | 6/2003 | Gunnarsson et al. ...... 370/389 |
| 2003/0134650 | A1 * | 7/2003 | Sundar et al. ............ 455/465 |
| 2003/0139180 | A1 * | 7/2003 | McIntosh et al. ......... 455/426 |
| 2003/0171112 | A1 * | 9/2003 | Lupper et al. ........... 455/414.1 |
| 2004/0001468 | A1 * | 1/2004 | Bichot et al. ............ 370/338 |

FOREIGN PATENT DOCUMENTS

WO        0219617    3/2002

OTHER PUBLICATIONS

F. Ostrowski, "Roaming Und Handover Zwischen UMTS UNK FUNK-LAN," 2002, NTZ (Nachrichtentechnische Zeitschrift), VDE Verlag GMBH, pp. 24-26.
Gerdes M. et al, "TCP Performance Analysis of Inter-System Handover Between WLAN and A UMTS Radio Access Network," Oct. 6, 1999, ITG Fachberichte, VDE Verlag, pp. 345-349.
Shiao-Li Tsao et al., "Design and Evaluation of UMTS-WLAN Interworking Strategies," VTC 2002-Fall. 2002 IEEE 56th. Vehicular Technology Conference Proceedings. Vancouver, Canada, Sep. 24-28, 2002, IEEE Vehicular Technology Conference, New York: NY: IEEE, US, vol. 1 of 4. Conf. 56, Sep. 24, 2002, pp. 777-781.

* cited by examiner

*Primary Examiner*—Erika A. Gary
(74) *Attorney, Agent, or Firm*—Volpe & Koenig, P.C.

(57) ABSTRACT

A method enabling a wireless remote terminal (UE) to access a universal mobile telecommunication system (UMTS) through a wireless local area network (WLAN) wherein UMTS services are transmitted to a format converter from a UMTS transceiver and the format converter changes the format of received messages to a WLAN format before transmission to the UE which is operating in the WLAN mode.

6 Claims, 3 Drawing Sheets

METHOD AND APPARATUS FOR WLAN-UMTS INTERWORKING EMPLOYING UMTS AIR INTERFACE

CROSS REFERENCE TO RELATED APPLICATIONS

This application claims priority from Application No. 60/399,787; filed on Jul. 31, 2002 which application is incorporated herein by reference.

FIELD OF INVENTION

The present invention relates to wireless communications. More particularly the invention deals with WLAN-UMTS interworking.

BACKGROUND

Subscribers, such as mobile stations (UEs), to a universal mobile telecommunication system (UMTS) which are operating under a wireless local area network (WLAN) environment and desire to access the UMTS, can incur a significant increase in costs when accessing UMTSs in those areas where the UMTS system access would be of substantial cost. An alternative for accessing a UMTS without incurring such substantial costs is desirable.

SUMMARY

The present invention provides a less expensive alternative for accessing a UMTS without incurring such substantial costs. The composite systems of the present invention comprises a UMTS system underlayed by a WLAN system. The UMTS is provided with a transceiver acting as a UMTS radio front-end for a UMTS subscriber operating in a WLAN environment. The interface between the UMTS system and the end user (UE) is obtained through the WLAN interface.

The WLAN system converts received UMTS messages and/or traffic for pre-registered users into a format suitable for WLAN transmission to be delivered to users operating in WLAN environments. In addition, the WLAN converts transmitted messages and traffic flows into UMTS formats which is then transmitted to the UMTS system by way of the UMTS transceiver supporting the WLAN system. The WLAN users gain access to the UMTS system through a UMTS air interface employing a translator.

BRIEF DESCRIPTION OF THE FIGURES

The present invention will be understood from a consideration of the accompanying description and drawings in which like elements are designated by like numerals and, wherein.

DETAILED DESCRIPTION OF THE PREFERRED EMBODIMENTS

Figure 1:
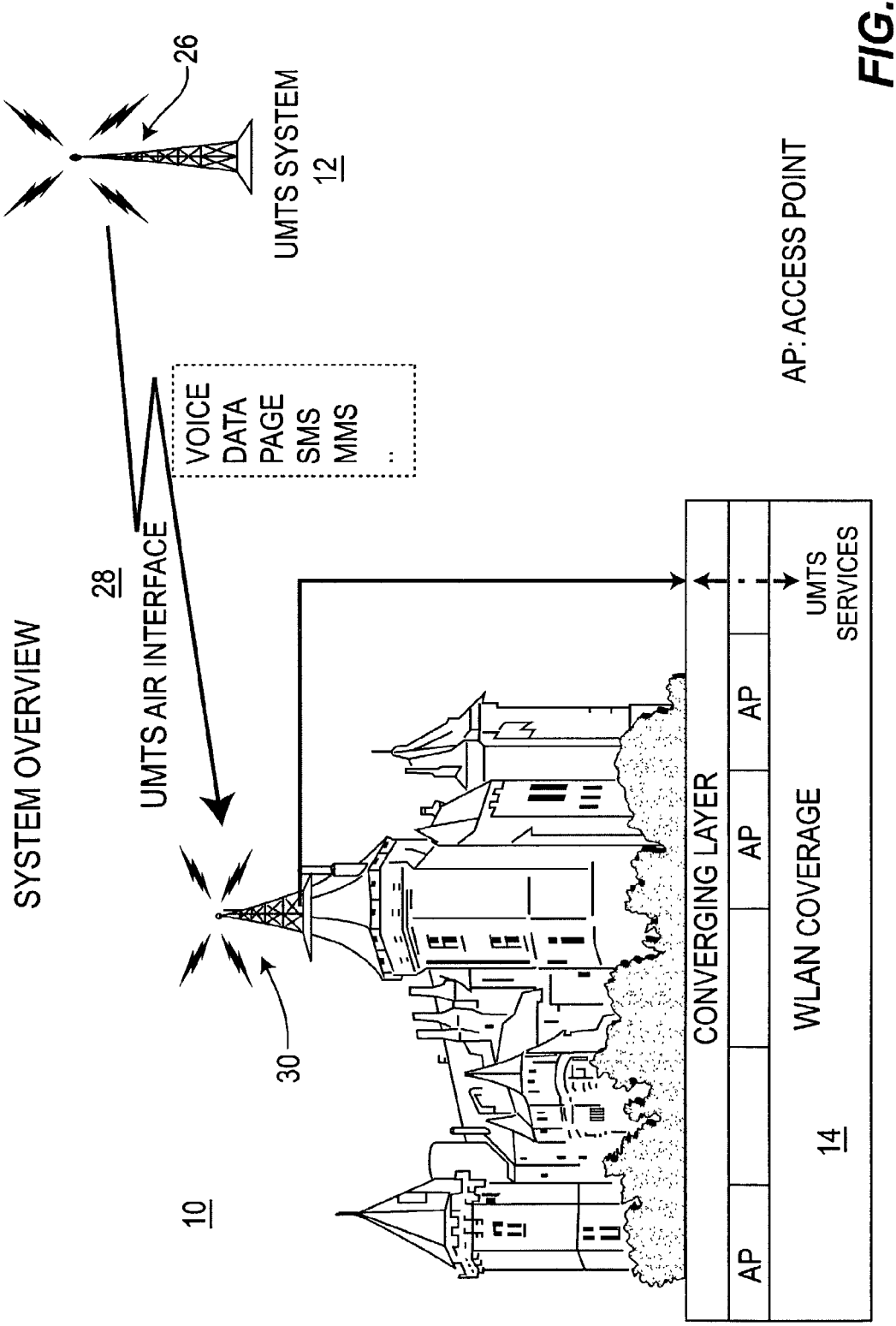
FIG. 1 is a diagram of a UMTS system underlayed by a WLAN system.

FIG. 1 shows an arrangement 10 useful in explaining the interworking between a UMTS system 12 and WLAN system 14. The arrangement of FIG. 1 will be described in conjunction with the technique for delivery of UMTS based services when a mobile station such as a remote terminal is served by the WLAN system.

Figure 2:
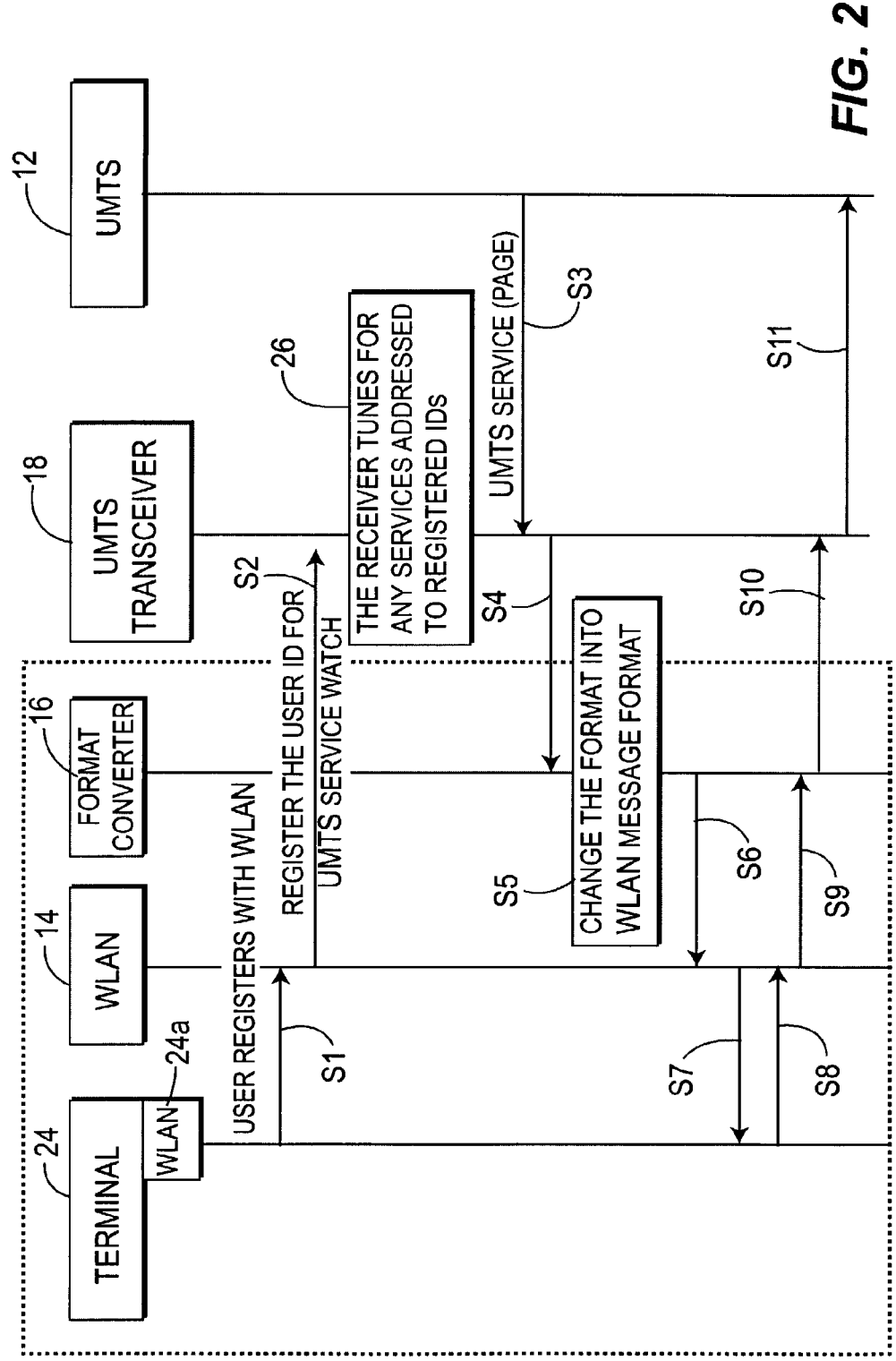
FIGS. 2 and 3 are diagrams showing the message utilized for the WLAN-UMTS interworking in accordance with the apparatus and methods of the present invention.

Making reference to FIG. 2, and, where appropriate, FIG. 1, there is shown an arrangement similar to that of FIG. 1.

Only one mobile station 24 is shown for purposes of simplicity, it being understood that a plurality of such mobile terminals are serviced by the WLAN 14. Although the mobile station remote terminal (UE) 24 may also be a dual-mode terminal capable of communicating with a WLAN and a UMTS, for purposes of the present invention, a WLAN-capable terminal 24 is utilized.

User terminal (UE) 24, through its WLAN capability 24a, registers with WLAN 14, by communicating with an access point (AP) of the WLAN (see FIG. 1) at step S1. WLAN 14, at step S2, then registers the user identification (ID) for the UMTS service watch, communicating with UMTS transceiver 18. UMTS transceiver 18 is tuned for any services addressed to registered users' identifications (IDs). When a UMTS service, such as a page, short message service (SMS), multimedia message service (MMS) or the like is to be delivered, UMTS 12 transfers such a service, in the example given a page message, at step S3, the page message being delivered to UMTS transceiver 18. UMTS transceiver 18, at step S4, typically from a radio tower 26, transmits the page message over UMTS air interface 28 to a receiving radio tower 30, to format converter 16 which, at step S5, converts the present (UMTS) format into a WLAN message format and, at step S6, communicates the page message, in WLAN message format, to WLAN 14. WLAN 14, at step S7, delivers the page message to mobile terminal 24. An acknowledgement is relayed from terminal 24, at step S8, to WLAN 14, the acknowledgement being transferred to format converter 16 at step S9 and from there to UMTS transceiver 18, at step S10, and finally to UMTS 12, at step S11.

Figure 3:
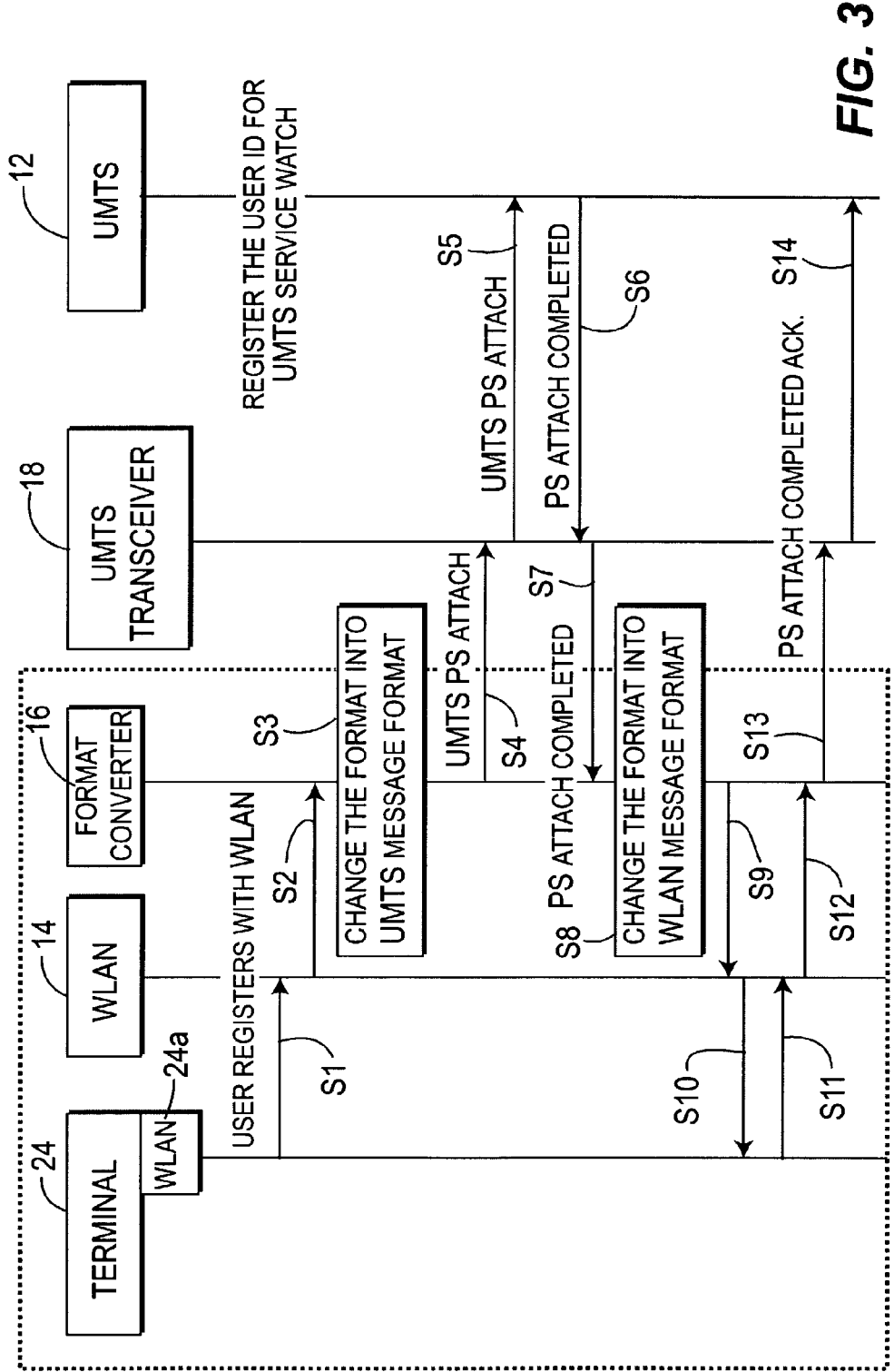

FIG. 3 shows a terminal 24 similar to that shown in FIG. 2, which, through its WLAN capability 24a, registers with WLAN 14, at step S1. The WLAN 14, at step S2, forwards the user registration to format converter 16 which, at step S3, changes the format into a UMTS message format and, at step S4, provides a UMTS package switched (PS) UMTS attachment directed to the UMTS transceiver 18. UMTS transceiver 18 transfers the UMTS PS attached to UMTS 12, at step S5.

The PS attach completed message is transferred from UMTS 12 to UMTS transceiver 18, at step S6, and from UMTS transceiver 18 to format converter 16, at step S7. Format converter 16, at step S8, changes the format of the PS attach into a WLAN message format and, at step S9, conveys the message to WLAN 14 which, at step S10, provides the message to mobile terminal 24. Acknowledgement from terminal 24 to WLAN 14 occurs at step S11, from WLAN 14 to format converter 16, at step S12, from format converter 16 to UMTS transceiver 18, at step S13 and the UMTS transceiver 18 to UMTS 12, at step S14, thereby completing the acknowledgment.

What is claimed is:

1. A method in which a wireless terminal accesses a universal mobile telecommunication system (UMTS) through a wireless local area network (WLAN), comprising:
   said terminal registering with the WLAN and acquiring a user ID;
   responsive to the terminal registering with the WLAN, said WLAN registering the terminal's user ID with a UMTS transceiver on the UMTS for purposes of a UMTS service watch;

responsive to registering the terminal's user ID, said UMTS transceiver watching for UMTS service messages to be delivered to the terminal;

when a UMTS service message to be delivered to the terminal is detected, the UMTS transferring the service message to the UMTS transceiver;

the UMTS transceiver transmitting the UMTS service message over a UMTS air interface directly to a format converter on the WLAN;

the format converter converting the UMTS service message to a WLAN message format;

the format converter communicating the UMTS message in WLAN message format to the WLAN; and the WLAN delivering the UMTS message in WLAN format to the terminal.

2. The method of claim 1, further comprising:

the terminal sending an acknowledge message (ACK) to the WLAN;

the WLAN transferring the ACK to the format converter;

the format converter converting the ACK to a UMTS message format;

the format converter transferring the ACK in UMTS message format to the UMTS transceiver; and the UMTS transceiver transferring the ACK in UMTS format to the UMTS.

3. A method in which a wireless terminal accesses a universal mobile telecommunication system (UMTS) through a wireless local area network (WLAN), comprising:

said terminal registering with the WLAN and determining a user ID;

responsive to the terminal registering with the WLAN, said WLAN forwarding the user registration to a format converter on the WLAN;

the format converter changing the format of the registration into a UMTS message format, providing a UMTS packet switched (PS) attach using the registration in UMTS message format, and directing the UMTS PS attach directly to a UMTS transceiver over a UMTS air interface;

the UMTS transceiver transferring the UMTS PS attach to a UMTS, wherein the terminal user ID is registered for a UMTS service watch; p1 the UMTS providing a PS attach completed message, and transferring the PS attach completed message to the UMTS transceiver;

the UMTS transceiver transferring the PS attach completed message directly to the format converter on the WLAN via the UMTS air interface;

the format converter converting the format of the PS attach completed message into a WLAN message format and conveying the PS attach completed message in WLAN format to the WLAN;

the WLAN directing the PS attach completed message in WLAN format to the terminal.

4. The method of claim 3, further comprising:

the terminal sending a PS attach completed acknowledgment message (ACK) to the WLAN;

the WLAN forwarding the ACK to the format converter;

the format converter converting the ACK to a UMTS format and sending the ACK in UMTS format directly to the UMTS transceiver over the UMTS air interface; and the UMTS transceiver sending the ACK in UMTS format to the UMTS, thereby completing the acknowledgment.

5. A system whereby a wireless terminal accesses a universal mobile telecommunication system (UMTS) through a wireless local area network (WLAN), comprising:

a WLAN comprising:

said WLAN configured to register a wireless terminal and determine a user ID for the terminal;

said WLAN configured, responsive to registering the terminal and determining its user ID, to register the terminal's user ID with a UMTS for purposes of a UMTS service watch; and a format converter, comprising:

said format converter configured to receive WLAN messages, convert the WLAN messages into a UMTS format and transfer the WLAN messages in UMTS format over a UMTS air interface; and said format converter configured to receive UMTS messages over a UMTS air interface, convert the UMTS messages into a WLAN format and transfer the UMTS messages in WLAN format to an access point (AP) of the WLAN; and a UMTS comprising:

said UMTS configured to register a terminal user ID for purposes of a UMTS service watch;

said UMTS configured to watch for UMTS service messages for the terminal user ID; and a UMTS transceiver configured to pass messages directly between itself and the format converter over a UMTS air interface.

6. The system of claim 5, wherein the UMTS transceiver is further configured to register the terminal's user ID for purposes of a UMTS service watch and watch for UMTS service messages for the terminal user ID.

* * * * *

UNITED STATES PATENT AND TRADEMARK OFFICE
CERTIFICATE OF CORRECTION

| | |
|---|---|
| PATENT NO. | : 7,050,800 B2 |
| APPLICATION NO. | : 10/319180 |
| DATED | : May 23, 2006 |
| INVENTOR(S) | : Shaheen et al. |

Page 1 of 1

It is certified that error appears in the above-identified patent and that said Letters Patent is hereby corrected as shown below:

IN THE SPECIFICATION

At column 1, line 45, after the word "which", delete "is" and insert therefor --are--.

IN THE CLAIMS

At claim 3, column 3, line 42, after the word "watch;", delete "p1".

At claim 3, column 3, line 42, after the word "watch;", begin new line 43 with "the UMTS providing a PS attach completed message, and transferring the PS attach completed message to the UMTS transceiver;.

Signed and Sealed this

First Day of May, 2007

JON W. DUDAS
*Director of the United States Patent and Trademark Office*